US009154559B1

(12) United States Patent
Bovee et al.

(10) Patent No.: US 9,154,559 B1
(45) Date of Patent: Oct. 6, 2015

(54) METHODS AND APPARATUS FOR SHARING PERSONAL SENSOR DATA

(71) Applicant: Combex, Inc., Lake Geneva, WI (US)

(72) Inventors: Jeffery Bovee, Walworth, WI (US); Matthew Murphy, Elkhorn, WI (US); Ryan Torgerson, Burlington, WI (US)

(73) Assignee: COMBEX, INC., Lake Geneva, WI (US)

( * ) Notice: Subject to any disclaimer, the term of this patent is extended or adjusted under 35 U.S.C. 154(b) by 278 days.

(21) Appl. No.: 13/669,008

(22) Filed: Nov. 5, 2012

Related U.S. Application Data

(60) Provisional application No. 61/555,153, filed on Nov. 3, 2011.

(51) Int. Cl.
*G06F 15/16* (2006.01)
*H04L 29/08* (2006.01)
(52) U.S. Cl.
CPC ............... *H04L 67/16* (2013.01); *H04L 67/125* (2013.01)
(58) Field of Classification Search
CPC ..... H04Q 2209/00; G01W 1/10; G01W 1/10; H04L 67/16; H04L 67/125
USPC .................. 709/200–205, 217–227, 228, 229
See application file for complete search history.

(56) References Cited

U.S. PATENT DOCUMENTS

| | | | |
|---|---|---|---|
| 7,787,869 B2 * | 8/2010 | Rice et al. .................. 455/414.2 |
| 8,154,398 B2 * | 4/2012 | Rolf et al. ..................... 340/506 |
| 8,446,275 B2 * | 5/2013 | Utter, II .................. 340/539.12 |
| 8,558,687 B2 * | 10/2013 | Haupt et al. .................. 340/506 |
| 8,793,522 B2 * | 7/2014 | Rahman et al. .............. 713/323 |
| 2002/0038353 A1 * | 3/2002 | Yamamoto .................... 709/217 |
| 2008/0085096 A1 * | 4/2008 | Marshall ......................... 386/52 |
| 2008/0207232 A1 * | 8/2008 | Rice et al. ..................... 455/466 |
| 2009/0243852 A1 * | 10/2009 | Haupt et al. .................. 340/541 |
| 2012/0188080 A1 * | 7/2012 | Haupt et al. .................. 340/540 |
| 2013/0331993 A1 * | 12/2013 | Detsch et al. ................. 700/275 |
| 2013/0338920 A1 * | 12/2013 | Pasken et al. ..................... 702/3 |
| 2014/0002277 A1 * | 1/2014 | Fulger et al. .................. 340/905 |
| 2014/0009306 A1 * | 1/2014 | Haupt et al. ............. 340/870.09 |
| 2014/0018106 A1 * | 1/2014 | Fulger et al. ............... 455/456.3 |
| 2014/0324351 A1 * | 10/2014 | Dannevik et al. ................. 702/3 |

* cited by examiner

*Primary Examiner* — Moustafa M Meky
(74) *Attorney, Agent, or Firm* — Drinker Biddle & Reath LLP

(57) ABSTRACT

A method and apparatus for sharing data regarding conditions sensed at one or more user-selected locations with others over the Internet generally or over Internet-accessed social networking systems using sensors located at user-selected locations and servers which are connected respectively to the Internet for communication with client devices or with social networking systems.

27 Claims, 3 Drawing Sheets

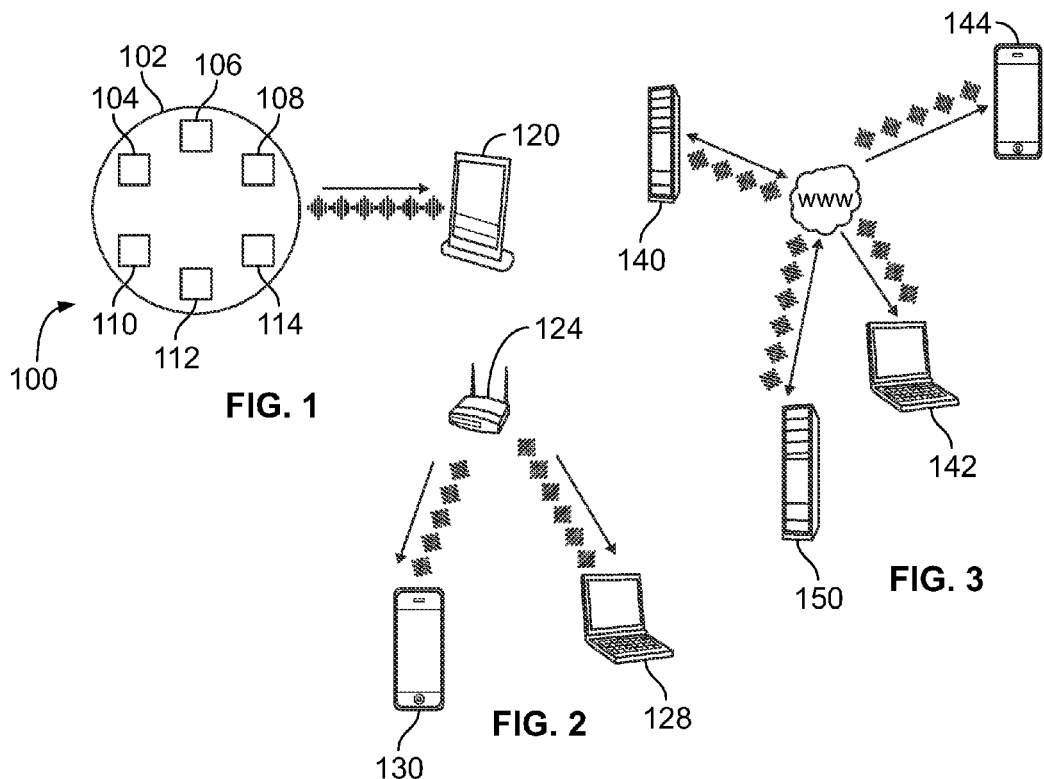
FIG. 1
FIG. 2
FIG. 3
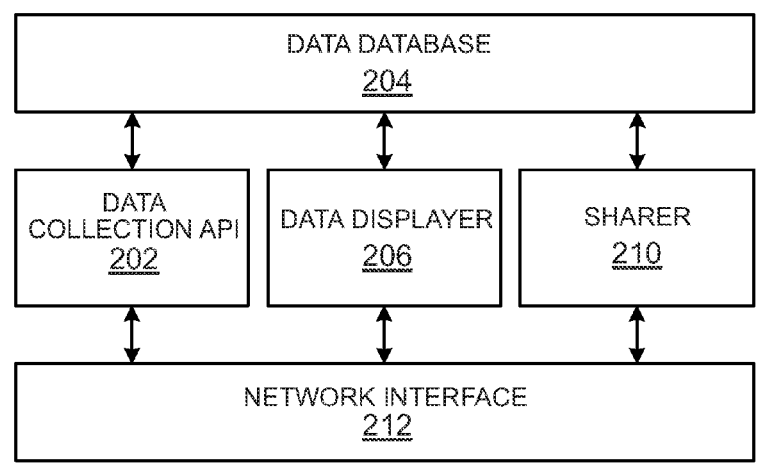
FIG. 5

FIG. 4

METHODS AND APPARATUS FOR SHARING PERSONAL SENSOR DATA

CROSS-REFERENCE TO RELATED PATENT APPLICATIONS

This patent application claims the benefit of U.S. Provisional Patent Application No. 61/555,153, filed Nov. 3, 2011.

FIELD

This invention pertains to sharing data via the Internet and, more particularly, to methods and apparatus for sharing personal sensor data via and via the Internet social networking systems.

BACKGROUND

People often have a need or desire to share information regarding conditions sensed at user-selected or "personal locations" such as weather and other data with others at remote locations. Such sensed conditions at personal locations are referred to herein as "personal sensor data" and the sensors themselves may be referred to as "personal sensors." The Internet offers a particularly convenient means for sharing such personal sensor data and social networking services offer a particularly desirable vehicle for sharing such data.

Many social networking services are available for facilitating social relationships between people via the Internet. The popularity of social networking services derives, at least in part, from people's desires to interact over the Internet and to share information regarding their activities, interests, backgrounds and other personal characteristics. The popularity of social networking derives not only from the desire of individuals to disclose such personal information to others that access the social networking systems but also from others' desire to learn and engage in dialogue regarding such personal information.

While sharing such information regarding an individual's activities, interests, etc. is already a focus of social networking services, no one has previously taught or suggested sharing personal sensor data via social networking services. For example, social networking service users may wish to use such networks to let others know weather conditions obtained by weather sensors positioned where the users are located. Or they may wish to position personal sensors to provide personal sensor data regarding soil moisture or temperature, the presence of allergens, sound levels, pollen levels, etc. to be shared over social networking systems.

SUMMARY

In one embodiment the invention comprises a method for a user to share data regarding conditions sensed at user-selected locations by selecting the locations and positioning one or more sensor at the locations. The sensors may be one or more types of weather sensors, or they may be various different types of sensors as described in more detail below.

These sensors are communicatively coupled to one or more micro-servers which gather and present the sensor data. The micro-sensors may be integral with the sensors or they may be independent devices. The one or more micro-servers are connected to the Internet whereby the data may be accessed over the Internet by a client device such as a smartphone or a laptop computer. Also, the micro-servers may provide data to social networking systems.

A data server may be provided to maintain a database of data collected or received from the micro-servers. The data server also may provide a Web-based graphical user interface presenting the data received or derived from the micro-servers. Where the sensors are weather sensors the data server may generate weather forecasts. Also, the data server may send one or more of text messages, SMS messages, email or RSS feeds to client devices. The data server may create, instantiate, install or initiate social networking applications that enable sharing of the sensor data on a social networking home page or other social networking display.

In another embodiment a method may be provided for sharing data regarding conditions sensed at one or more user-selected locations with others over social networking systems. In accordance with this method a social networking server is supplied with an application to enable users to share sensor data received from a data server. Finally, data obtained by one or more sensors and input to the data server is input therefrom to the social network server.

In yet another embodiment a process is embodied in program code or computer-readable instructions stored on a tangible machine-readable medium accessed by a computer for sharing data regarding conditions sensed at one or more user-selected locations with others over social networking systems. The process includes new or additional sensor data received from a user-selected location.

In a further embodiment a social networking application is modified, updated, created, instantiated, installed or initiated to enable sharing of the sensor data with connected friends, family and colleagues. When new or additional sensor data is received, the social networking application is updated.

In another embodiment an apparatus is provided for sharing data regarding conditions sensed by one or more sensors located at one or more user-selected locations with others over social networking systems. A data server is also provided and operatively connected to the sensors for delivering the sensor data to others over social networking systems. The data server includes a database, a data collection application programming interface to enable the sensors to provide data to the data server, a data database for storing the sensor data, a data displayer for presenting the data, a sharer for initiating social networking applications that enable data sharing with the social networking system, and a network interface for interfacing the data server with the Internet.

BRIEF DESCRIPTION OF THE DRAWINGS

The features and advantages of this disclosure will become apparent on review of exemplary embodiments addressed below with reference to the attached drawings, in which:

FIG. 1 illustrates an embodiment in which the personal sensor data is weather data at a user's home;

FIG. 2 illustrates an embodiment for sharing personal weather data over the Internet;

FIG. 3 illustrates an embodiment for sharing personal weather data on a social networking system;

FIG. 4 illustrates a manner of implementing a weather data server to share weather data via a social networking system;

FIG. 5 illustrates a web-based weather display interface; and

DETAILED DESCRIPTION

Figure 6:
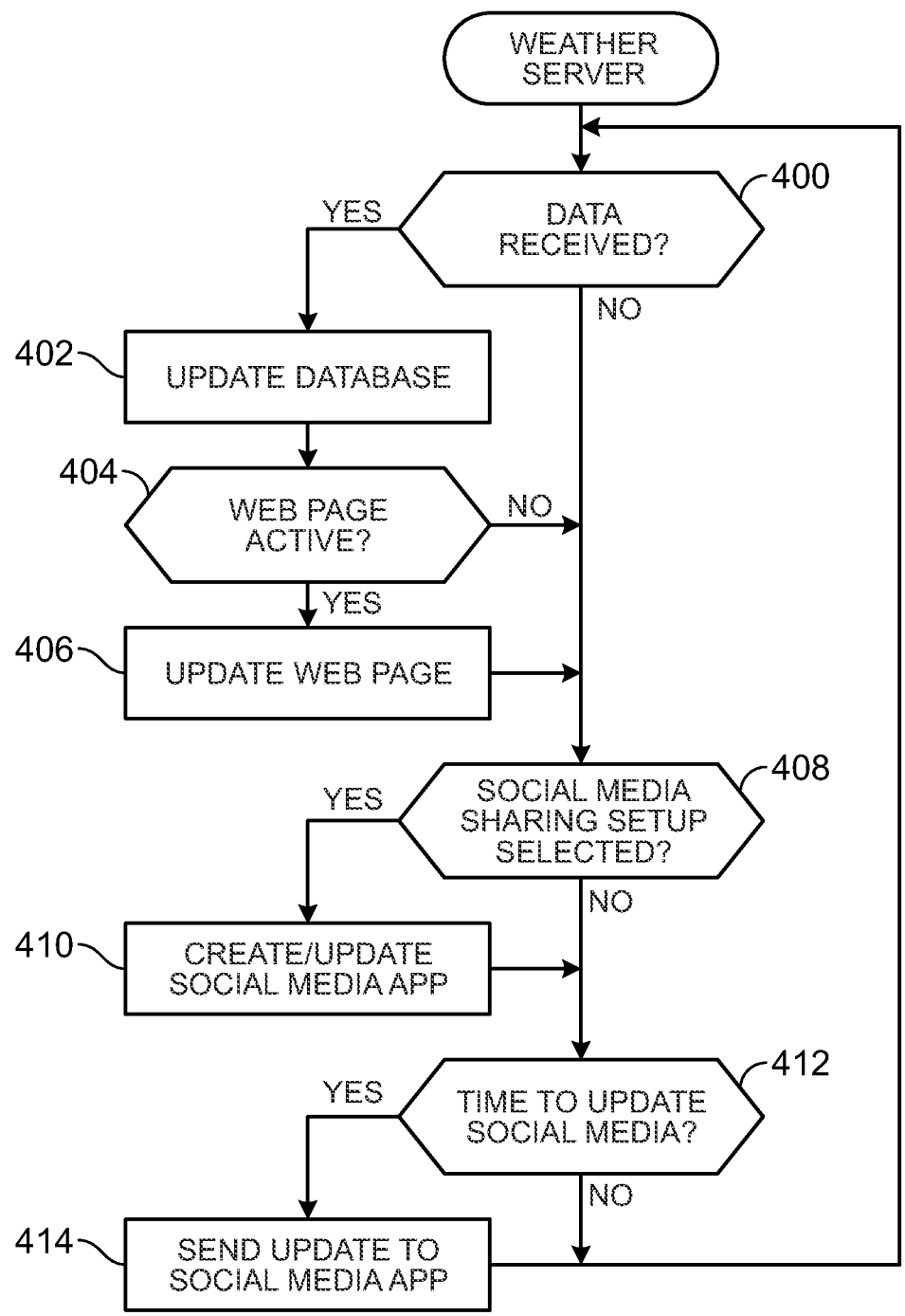
FIG. 6 is a flowchart illustrating an example process that may, for example, be embodied as machine-readable instructions executed by one or more processors to implement data servers.

Methods, apparatus and articles of manufacture for sharing location-based sensor data such as weather data at user-selected locations via the Internet generally and via social networking services in particular are disclosed herein. These methods and apparatus enable users to share sensor data from user-selected locations like personal weather data or other sensor data collected at a user's home, place of work, or other place of interest to the user.

A social networking service is intended for present purposes to comprise an online service that facilitates social relations among social networking services users where each user has a profile containing one or more of his or her social links or "friends", as well as, e.g., his or her interests, selected photographs, personal data such as birth dates, marital status and other, self-descriptions, recommendations and associated links, etc. and other information related to the user. The social networking services are Web-based and may enable users to interact over the Internet by, for example, e-mail or instant messaging. Examples of social networking services include Facebook, Google+, Twitter, Mexopia, MySpace, Ning, Tagged, and Bebo. Using the embodiments disclosed herein, a user can share sensor data at user-selected locations such as weather (or other) data obtained at their home, place of business, etc. with their circle of acquaintances including friends, family and colleagues via such a social networking service.

Exemplary embodiments will now be described with reference to the accompanying drawings in which like numerical designations will be given to like features with reference to the accompanying drawings wherein:

FIG. 1 is a schematic illustration of an embodiment in which the personal sensor data is weather data collected at a user's home. To collect personal sensor data representative of local weather conditions, a user may utilize any number or type of weather sensors, such as one or more of those which are represented at reference numerals 104-112. Exemplary weather sensors 102 include, but are not limited to, a rain gauge 104, a wind speed gauge 106, a wind direction indicator 108, a temperature sensor 110, a humidity sensor 112, and an all-in-one weather sensor 114 which includes two or more of the previously listed sensors. Weather sensors 104-114 may be positioned at the same or different user-selected locations, i.e., the user's personal weather data.

If the user wishes to view the personal weather data himself, he may utilize any appropriate type of weather station or other device for displaying sensor data ("the local display unit"), such as the weather station designated at reference numeral 120. Thus, weather sensors 104-114 may be communicatively coupled to a weather station 120 via any available communication technology or communication media. For example, the weather sensors 104-114 may be adapted to wirelessly communicate weather information to weather station 120. Weather station 120 is thus one type of a local display unit—other local display units adapted to process and display non-weather related data will be used with other sensors.

The personal weather (or other) data gathered in the example of FIG. 1 may be shared over the Internet using a data micro-server (or bridge) 124 as illustrated in FIG. 2. Data micro-server 124 will log weather (or other) data collected or received from communicatively coupled weather (or other) sensors 104-114 or received from a communicatively coupled local display unit. The micro-servers may be integral with the sensors or they may be separate devices.

Data micro-server 124 can present historical and/or current data at one or more user-selected locations using a Web-based graphical user interface (GUI) (e.g., a Web page) that is accessible via any appropriate type or number of client devices such as laptop computer 128 or smartphone 130. In some embodiments, the Web-based GUI may be user-configurable. The client devices include, but are not limited to, a smartphone or a personal computer, as shown, as well as a tablet computing device, a set-top box, an Internet-enabled television or any other device capable of displaying web pages. The client devices may be communicatively coupled to the weather data micro-server 124 via, for example, a wired or wireless local area network (LAN).

Figure 4:
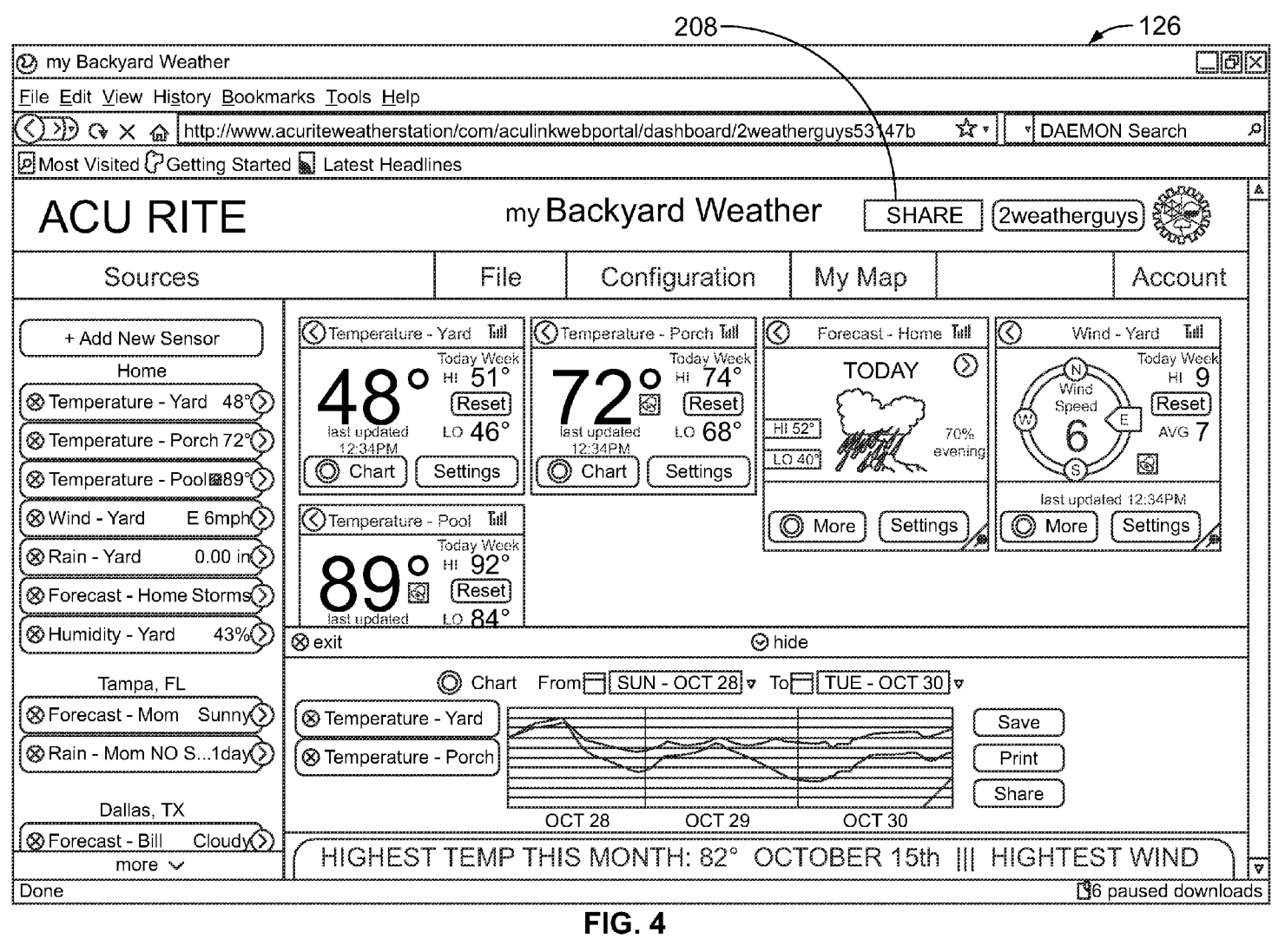

An exemplary GUI display 126 is provided in FIG. 4 showing temperatures, and wind direction and speed in two personal locations, the user's yard and the user's porch. This data comes from sensors located at the user's porch and yard which gather and supply the data. As can be seen on the display, rain conditions, humidity as well as weather forecasts can also be determined and displayed for the two locations. Finally, a chart may be generated and displayed at the bottom of the page to supply historical weather data for each of the user's personal locations.

Data micro-server 124 of FIG. 3 may be communicatively coupled to the Internet via any number or type of communication device such as a router, a broadband modem, an optical network unit (ONU) or, a cellular modem.

To share weather (or other sensor) data, preferably a data server 140 will be used to maintain a database of data collected or received from data micro-server 124. For example, a user can configure data micro-server 124 to aperiodically or periodically provide weather (or other sensor) data to data server 140 as it is collected. Where the user collects weather (or other sensor) data at multiple personal locations, data server 140 may associate the data from the multiple locations within the database.

In some embodiments, data server 140 may provide and implements on-line communities that allow interested persons to share weather (or other) data. For example, the shared data may be based on collected weather data, whereby data server 140 can generate weather forecasts and weather forecast information (e.g., a weather ticker) to users via their associated client devices. Data server 140 can also provide weather related imagery (e.g., a radar image, a sky view image, or a user taken photograph or video) or other imagery associated with other sensed data associated with the type of data being sensed.

Data server 140 can present historical or current weather data and/or conditions (or other historical or current sensor data) using a web-based GUI (e.g., a web page) accessible by any number and/or type of client devices such as laptop 142 or smartphone 144. The client devices may be communicatively coupled to data server 140 via the Internet. An example web-based GUI that may be presented to display current and/or historical weather information or control sharing of weather information is described in connection with FIG. 3. The client devices thus can be used to obtain weather (and other) data associated with different personal (user-selected) locations. In some embodiments, data server 140 may be configurable to send text messages, short message service (SMS) messages, RSS feeds, or electronic mail (email) messages based on detected weather conditions (or other sensor data) and user preferences.

An example process for implementing weather data server 140 is described below in connection with FIG. 5. This process that may be embodied as machine-readable instructions executed by one or more processors to implement weather data server 140 is described below in connection with this figure. Data server 140 may be used to share weather (or other) data via social networking systems as illustrated in FIG. 3.

To share weather (or other) data via social networking systems, the weather (or other) data server may create, instantiate, install and/or initiate social networking applications that enable substantially real-time sharing of weather (or other) data with social network connected friends, family and colleagues. Such social networking applications may be presented on, for example, a social networking homepage, wall, or other social networking display. The social networking applications may be used by data server 140 or directly by a user to periodically or aperiodically share weather (or other) sensor data or to share sensor data on demand via the social networking system.

Where a weather (or other) data sharing system is used as described herein, any of the illustrated devices may be combined, divided, re-arranged, omitted, eliminated and/or implemented in any other way. Data micro-server 124 and data server 140 may be implemented by computer(s) or machine(s) having a processor, circuit(s), programmable processor(s), fuses, application-specific integrated circuit(s) (ASIC(s)), programmable logic device(s) (PLD(s)), field-programmable logic device(s) (FPLD(s)), field-programmable gate array(s) (FPGA(s)), etc. When any embodiment of this disclosure is interpreted to cover a purely software and/or firmware implementation, at least one of the weather data servers is expressly defined to include a tangible article of manufacture such as a tangible computer-readable storage medium storing machine-readable instructions such as the firmware and/or software.

Weather conditions or other personal sensor data can be supplied to social networking systems in accordance with embodiments of the invention. In such applications, a social networking server 150 will be present and supplied with applications that enable users to share personal weather data (or other sensor data) with their social network connected friends, family and colleagues.

To collect received weather (or other) data, the designated data server 200 of FIG. 5 includes a weather (or other) data collection application programming interface (API) 202. Data collection API 202 enables other devices such as the weather sensors 104-112 and/or weather data servers (or other sensors/data servers) to provide weather (or other) data to data server 200.

To store collected weather (or other) data, data server 200 includes a data database 204. Any number or type(s) of data structures (e.g., tables, records, entries, etc.) may be used to store data in database 204. The data database 204 may be stored on any number and/or type of volatile or non-volatile memory device, memory or storage device.

To present current and/or historical weather (or other) data, data server 200 includes a data displayer 206. The data displayer may present weather (or other sensor) data via one or more web-based GUIs such as that shown in FIG. 4, or via text messages, SMS messages or email messages. As shown in FIG. 4, the web-based GUI may include a selectable element 208 that a user may use to activate, configure, control or enable sharing of weather (or other) data via social networking systems. Selectable element 208 may, for example, initiate another web-based GUI that enables a user to configure what weather (or other) data to share, how often to update shared data, to provide user credentials associated with a social networking account into which data is to be shared, etc.

To share weather (or other sensor) data on social networking systems, data server 200 includes a sharer 210. The sharer creates, instantiates, installs and/or initiates a social networking application on behalf of a user that enables substantially real-time sharing of the user's weather (or other) sensor data with social networking system connected friends, family and colleagues. The social networking application may be presented or displayed on, for example, a social networking homepage, wall, etc.

The social networking application may be implemented by linking a uniform resource locator (URL) to a portion of a user's homepage, wall, etc. The social networking system (e.g., the social networking server 150) uses the URL to obtain, for example, hypertext markup language (HTML) code, JavaScript or cascading style sheets (CSS) that define how and what weather (or other sensor) data is to be presented. For example, the HTML code, JavaScript and/or CSS may contain one or more links to data server 200 that allows the application to obtain the weather (or other) data to be presented. The application may be configured to periodically or aperiodically poll data server 200 for updated weather (or other) information. Alternatively, the data being presented may be updated when manually triggered by the user, and/or automatically when the data server 200 receives updated weather (or other sensor) data.

To communicatively couple data server 200 with other devices such as social networking server 150, client devices such as laptop 142 or smartphone 144 or other data server 140, any number and/or type(s) of network interface(s) 212 may be used. Network interfaces 212 may include, but are not limited to, a wired Ethernet interface, a wireless Ethernet interface, and the like.

While an example data server 200 is illustrated in FIG. 5, any of the illustrated elements may be combined, divided, re-arranged, omitted, eliminated and/or implemented in any other serviceable way. Data server 200 may be implemented by computer(s) or machine(s) having a processor, circuit(s), programmable processor(s), fuses, ASIC(s), PLD(s), FPLD (s), FPGA(s), etc. Data server 200 may include elements instead of, or in addition to, those illustrated in FIG. 5, and may include more than one of any or all of the illustrated elements.

FIG. 4 illustrates a web-based GUI that may be presented by any of weather data servers 140 or 200. As shown, the web-based GUI includes the selectable element 208 that allows a user to activate, control, configure or enable sharing of weather data into social networking systems. The selectable element 208 may, for example, initiate another web-based GUI that enables the user to configure what weather data to share, how often to update shared weather data, to provide user credentials associated with a social networking account into which weather data is to be shared, etc. Alternatively, the selectable element 208 may be used to push updated data into a social networking system page or display configured by the user for sharing the user's weather (or other) data.

FIG. 6 is a flowchart of an example process that may be implemented as instructions carried out by one or more processors to implement any of the data servers 140 and 200. While the flowchart refers to weather data servers, the data may be supplied to the servers from any desired personal sensor. Thus, in discussing the flowchart it should be assumed that the various steps may be performed not only on data received from personal weather sensors but also on data received from any personal sensors.

The process of FIG. 6 may be embodied in program code or computer-readable instructions stored on a tangible machine-readable medium accessible by a processor, a computer or other machine having a processor. Computer-readable instructions comprise, for example, instructions that cause a processor, a computer and/or a machine having a processor to perform one or more particular processes. Alternatively, some or all of the example process may be implemented using any combination of fuses, ASIC(s), PLD(s), FPLD(s), FPGA(s), discrete logic, hardware and firmware.

For ease of discussion, the process of FIG. 6 will be described with reference to weather data server 200 of FIG. 5. The process of FIG. 6 begins with the data collection API 202 determining whether new or additional weather (or other personal sensor) data is received (block 400). If new or additional data is received, the data collection (or collection of other non-weather personal data) API 202 updates the data database 210 (block 402).

If a Web page associated with the new or additional weather data is active on the social networking system (block 404), data displayer 206 updates the web page (block 406). If there is no active associated web page (block 404), the web page update is not performed.

If sharing of data into a social networking system has been newly activated and/or updated via a displayed web page (block 408), sharer 210 modifies, updates, creates, instantiates, installs and/or initiates a social networking application on behalf of a user that enables substantially real-time sharing of the user's data (or other personal sensor data) with connected friends, family and colleagues (block 410).

When shared data is to be updated (block 412), sharer 210 updates the shared data by, for example, updating the associated social networking application and/or updating the data linked to the social networking application (block 414). The shared data may be updated on a periodic basis, an aperiodic basis, whenever the user manually triggers an update, or when new or updated data is received.

As used herein, the terms "tangible computer-readable storage medium" and "non-transitory computer-readable storage medium" are defined to expressly exclude propagating signals and to exclude any computer-readable media on which signals may be propagated. However, a computer-readable storage medium may include internal signal traces, cables, wires and/or internal signal paths carrying signals thereon. Example tangible and/or non-transitory computer-readable medium may be volatile and/or non-volatile, and may include a memory, a memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage device, a magnetic storage device and/or any other device in which information is stored for any duration (e.g., for extended time periods, permanently, during buffering, and/or during caching) and which can be accessed by a processor, a computer and/or other machine having a processor. The computer-readable storage medium can also be distributed over network-coupled computer systems (e.g., be a network-attached storage device, a server-based storage device, and/or a shared network storage device) so that computer-readable code may be stored and executed in a distributed fashion. Such a media can be read by a computer, instructions thereon stored in a memory, and executed by a processor.

The embodiments disclosed herein may include a tangible computer-readable storage medium for storing program data, a processor for executing the program data to implement the methods and apparatus disclosed herein, a communications port for handling communications with other devices, and user interface devices such as a display, a keyboard, a mouse, a display, etc. When software modules are involved, these software modules may be stored as program instructions or computer-readable codes, which are executable by the processor, on the tangible computer-readable storage medium.

While embodiments described above have been directed to methods and apparatus to share personal weather sensor data via social networking systems, other embodiments entail sharing other personal sensor data. Examples of personal sensors that may be used to share other personal data via social networking systems as discussed above include:

Snow Level

A user may wish to share the snow level at his or her home or other personal location. An optical sensor that may be used in such an application may employ, e.g., sunlight, projected light or laser light which is shined onto a measurement area of the top surface of the snow in a specific predetermined pattern that is recognizable to an optical receiver of the sensor. The sensor (or associated conventional electronics) calculates the snow level by comparing the size of the actual pattern with the size of the predetermined pattern, or changes in the snow level based on changes in the size of the pattern.

Another optical method for monitoring snow level is to detect light from a series of incremented receivers, projectors or reflectors mounted at different depths within the snow thickness to be measured.

An ultrasonic method for determining snow height entails transmitting sound waves onto the surface of the snow and measuring the time for the return of the sound waves from which the distance from the sensor and hence the snow level can be determined.

Water Leaks

A personal sensor such as a pair of spaced electrodes that recognizes a drop in resistance between the electrodes indicative of the presence of water would be mounted on, e.g., a basement wall, floor or sump pump well, in a boat, or in any other personal location where a user wishes to sense and report the presence of water via a social networking system.

Soil Moisture or Soil Temperature

A user may want his or her friends, family or other social network users to know what the soil moisture or temperature is at a personal location associated with the user. A conventional temperature or soil moisture sensor would be installed at this location to provide this data.

UV Level

Since UV radiation levels have important health ramifications, a conventional UV sensor may be positioned at a personal location and data obtained by that sensor provided to the user's social network page.

Allergens, Fungus, Mold, or Bacteria Levels

Apparatus for sensing moisture, temperature and other conditions that may produce allergens, fungus, mold or bacteria will be positioned at a personal location to provide this data to an apparatus that calculates the potential allergens, fungus, mold or bacteria levels and supplies this personal data to the user's social network page.

Number of Lightning Strikes and Distance to Lightning Strikes

Personal data regarding the number of lightning strikes and distance to lightning strikes can be obtained by monitoring the AM radio spectrum and applying triangulation to obtain this data and supply it to the user's social network page.

$CO_2$/CO Level

This personal data may be provided to the user's social network page by conventional CO or $CO_2$ sensors positioned at a personal location.

Smoke, Fog and Visibility

A particle sensor positioned at the personal location can provide an indication of the presence of smoke or fog at a personal location or to provide a measure of visibility.

pH Data

The pH level of pool water, soil, fish tanks, ponds, etc. may be determined by placing pH sensors in these personal locations and transmitting the resulting data to a social networking system as described above.

Motion Detection

A conventional motion detector can be used to provide an indication of whether anyone is present or "at home" in the personal location or whether wildlife is present where a conventional motion sensor (or trail camera) is placed and this motion or image data is transmitted to and displayed on the user's social network page.

Light Detector

A visible or UV light sensor may be placed at a personal location to provide an indication of whether lights are on or off at that location, to indicate whether it is sunny at a personal location (and e.g., whether sunscreen will be needed), or to indicate whether sun-control devices such as shades, awnings or umbrellas must be used at the personal location.

Wave Height/Tidal Monitor

Information regarding wave height and tides at a personal location may be generated by using, e.g., fast-acting water pressure measuring devices or floats/buoys at the desired personal river, lake or ocean locations. The measurements may also be taken ultrasonically by transmitting sound waves onto the surface of the water and measuring the return waves to indicate the distance from the sensor and hence the wave height. Since the wave height sensor is mounted at a fixed point, current measurements can be compared to older measurements to determine changes in wave or water height.

Sound

A microphone or other monitoring device may be placed at a personal location to measure and report the decibel level of sound or presence of sound at a personal location or to transmit music or conversation at the personal location to the social networking system.

Food Readiness/Time Left to Cook

Food readiness/time left to cook data can be provided on the social networking system in order to indicate whether food such as, e.g., a turkey at the personal location is done, or when visitors need to arrive in order to enjoy a fully cooked bird. The data will use conventional temperature or time left to cook devices that use appropriate algorithms to determine the time left to cook based on temperature and rate of temperature change of the cooking food.

Power Monitoring

Voltage and amperage sensors at a personal location can be used to provide data regarding the level of grid, solar or battery power available or being consumed at the personal location.

Breathalyzer

Social network users often identify the alcohol that they drink, how much they drink and their resulting behavior, good or bad. A conventional breathalyzer at a personal location associated with the user may be used to substantiate such representations.

Fish Presence Monitoring

A conventional sonar sensor may be located at a personal location to indicate the presence of fish and likely fishing success at that location.

Any references, including publications, patent applications, and patents cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, disclosed embodiments may employ various integrated circuit components, e.g., memory elements, processing elements, logic elements, look-up tables, and the like, which may carry out a variety of functions under the control of one or more microprocessors or other control devices. Similarly, where disclosed elements are implemented using software programming, the disclosed software elements may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosed embodiments can employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of clarity, conventional electronics, control systems, software development and other functional aspects of the systems (and components of the individual operating components of the systems) may not be shown in the figures or described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosed embodiments unless the element is specifically described as "essential" or "critical".

The use of the terms "a" and "an" and "the" and similar references in the context of describing examples are to be construed to cover both the singular and the plural. Furthermore, any recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; or any or all of the process may be carried out sequentially and/or carried out in parallel by, for example, separate processing threads, processors, devices, discrete logic, circuits, etc. The use of any and all examples, or exemplary language (e.g., "such as" or "for example") provided herein, is intended merely to better illuminate aspects of the disclosure and does not pose a limitation on the scope of this disclosure unless otherwise claimed. Numerous modifications and adaptations will be readily apparent to those skilled in this art without departing from the spirit and scope of the disclosure.

While methods and apparatus to share personal data have been particularly shown and described with reference to exemplary embodiments thereof, it will be understood by those of ordinary skill in the art that various changes in form and details may be made therein without departing from the spirit and scope of this disclosure.

We claim:

1. A method for a user to share sensor data regarding weather conditions sensed at user-selected locations comprising:
    selecting a location and locating one or more weather sensors at the location to provide sensor data regarding the weather conditions at the user-selected location;
    communicatively coupling one or more micro-servers to the one or more weather sensors to gather and present the sensor data;
    communicatively coupling the one or more micro-servers to the Internet, whereby the sensor data may be accessed over the Internet by a client device;
    communicatively coupling the one or more micro-servers to a data server;
    transmitting the sensor data by the one or more micro-servers to the data server; and
    transmitting the sensor data by the data server to a social network application installed on a social network account of the user on a social network server, wherein the user's social network account includes user-selected connections to other social network accounts that automatically facilitate the other social network accounts to receive the sensor data via the social network application.

2. The method of claim 1 wherein the one or more micro-servers are integral with the one or more weather sensors.

3. The method of claim 1 wherein the one or more weather sensors are selected from the group consisting of rain gauges, wind speed gauges, wind direction indicators, temperature sensors, and humidity sensors.

4. The method of claim 1 wherein the weather sensors are adapted to measure one or more types of data selected from the group consisting of snow level, soil moisture, soil temperature, UV level, fungus level, mold level, bacteria level, number of lightning strikes, distance to lightning strikes, $CO_2$ level, CO level, presence of fog, pH level, wave height, and tidal characteristics.

5. The method of claim 1 in which the micro-server is communicatively coupled to the Internet by a router, a broadband modem, an optical network unit, or a cellular modem.

6. The method of claim 1 in which the data server comprises a database of the sensor data collected or received from the one or more micro-servers.

7. The method of claim 6 in which the one or more micro-servers are configured to periodically or aperiodically provide the sensor data to the data server.

8. The method of claim 6 wherein the data server provides the sensor data via the Internet to a client device of the user, the client device being communicatively coupled to the data server via the Internet.

9. The method of claim 8 in which the sensor data is provided using a Web-based graphical user interface.

10. The method of claim 8 in which the data server generates weather forecasts and weather forecast information based on the sensor data at the user's selected location and sends the weather forecast information to at least one of the client device and the social network server.

11. The method of claim 8 in which the client device is selected from the group consisting of a smartphone, a personal computer, a tablet computing device, a set-top box, an Internet-enabled television, and any other device capable of displaying web pages.

12. The method of claim 6 in which the data server is configured to send one or more of text messages, short message service (SMS) messages, RSS feeds, or electronic mail messages (email) containing the sensor data to client devices.

13. The method of claim 6 in which the micro-servers and the data server are implemented by machine-readable instructions executed by one or more computer processors.

14. The method of claim 1 in which the data server creates, instantiates, installs or initiates the social network application that enables sharing of the sensor data on a social networking home page or other social networking display.

15. The method of claim 1 in which the data server uses the social network application to share the sensor data periodically, aperiodically, or on demand.

16. The method of claim 6 in which the data server is configured to provide weather related imagery associated with the sensor data.

17. A method for a user of a social networking system to share data regarding weather conditions sensed at one or more user-selected locations with other users of the social networking system comprising:
    selecting one or more locations and locating one or more weather sensors at the one or more locations to provide sensor data;
    providing an application for a social networking server of the social networking system to enable the user to share the sensor data received from the one or more weather sensors via a social network account of the user, wherein the user's social network account includes user-selected connections to social network accounts of the other users that automatically facilitate the other users to receive the sensor data via the application; and
    inputting the sensor data obtained by the one or more weather sensors to the social networking server via a data server.

18. The method of claim 17 in which the data server is operatively connected to the Internet to supply the sensor data obtained by the one or more weather sensors to the other users over the social networking system.

19. The method of claim 18 in which the data server includes a data collection application programming interface for inputting the sensor data to the data server, a database using a data structure to store the sensor data on a memory or storage device, and a data displayer for displaying the sensor data in graphical user interfaces, text messages, SMS messages, RSS feeds, or email messages.

20. The method of claim 19 in which the data displayer is a graphical user interface and the graphical user interface includes a selectable element to activate, configure, control or enable sharing of the sensor data via the social networking system.

21. The method of claim 18 in which the data server includes a sharer to create, instantiate, install or initiate the application for the social networking server to enable sharing of the sensor data with the other users connected to the user via the social networking system.

22. A process embodied in program code or computer-readable instructions stored on a tangible machine-readable medium accessed by a computer for sharing weather data regarding weather conditions sensed at one or more locations selected by a user of a social networking system with other users of the social networking system comprising:

determining whether new or additional sensor data is received from a weather sensor at a user-selected location and if new or additional data is received updating a database;

modifying, updating, creating, instantiating, installing or initiating a social networking application for a social networking system on behalf of the user to enable sharing of the sensor data with the other users via a social network account of the user, wherein the user's social network account includes user-selected connections to social network accounts of the other users that automatically facilitate the other users to receive the sensor data via the application; and when new or additional sensor data is received from the weather sensor at the user-selected location, updating the associated social networking application.

23. The method of claim 22 including determining whether a Web page, associated with the new or additional sensor data and displayed over the social networking system, is available and if so updating the Web page using a weather data displayer.

24. The method of claim 22 in which the sensor data is updated on the social networking system on a periodic basis, an aperiodic basis, when manually triggered, or when new data is received.

25. The method of claim 22 wherein the weather sensors are adapted to measure one or more types of data selected from the group consisting of snow level, soil moisture, soil temperature, UV level, fungus level, mold level, bacteria level, number of lightning strikes, distance to lightning strikes, CO2 level, CO level presence of fog, pH level, wave height, and tidal characteristics.

26. An apparatus for a user of a social networking system to share data regarding weather conditions sensed at one or more user-selected locations with other users of the social networking system comprising:

one or more weather sensors located at user-determined locations to provide sensor data; and a data server operatively connected to the weather sensors for delivering the sensor data from the one or more weather sensors to the other users over the social networking system via a social network account of the user, wherein the user's social network account includes user-selected connections to social network accounts of the other users that automatically facilitate the other users to receive the sensor data, the data server including a data collection application programming interface to enable the weather sensors to provide data to the data server, a data database for storing the sensor data, a data displayer for presenting the sensor data, a sharer for initiating social networking applications that enable sharing of the sensor data with the social networking system, and a network interface for interfacing the data server with the Internet.

27. The apparatus of claim 26 wherein the weather sensors are adapted to measure one or more types of data selected from the group consisting of snow level, soil moisture, soil temperature, UV level, fungus level, mold level, bacteria level, number of lightning strikes, distance to lightning strikes, CO2 level, CO level, presence of fog, pH level, wave height, and tidal characteristics.

* * * * *